(12) United States Patent
Raines et al.

(10) Patent No.: US 9,327,667 B1
(45) Date of Patent: May 3, 2016

(54) ACTIVE BOLSTER WITH SUPPLEMENTAL BRACING

(71) Applicant: FORD GLOBAL TECHNOLOGIES, LLC, Dearborn, MI (US)

(72) Inventors: Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 11 days.

(21) Appl. No.: 14/570,132

(22) Filed: Dec. 15, 2014

(51) Int. Cl.
B60R 21/04 (2006.01)

(52) U.S. Cl.
CPC ......... B60R 21/04 (2013.01); *B60R 2021/0407* (2013.01)

(58) Field of Classification Search
CPC ................. B60R 21/04; B60R 2021/0407
See application file for complete search history.

(56) References Cited

U.S. PATENT DOCUMENTS

| | | | |
|---|---|---|---|
| 7,874,578 B2 | 1/2011 | Thomas et al. | |
| 8,205,909 B2 | 6/2012 | Kalisz | |
| 8,328,233 B2 | 12/2012 | Kalisz | |
| 8,459,689 B2 | 6/2013 | Roychoudhury | |
| 8,474,868 B2 | 7/2013 | Kalisz et al. | |
| 8,579,325 B2 | 11/2013 | Roychoudhury | |
| 8,998,298 B2 * | 4/2015 | Gerwolls | F16F 7/128 188/377 |
| 2007/0278776 A1 * | 12/2007 | Makita | B60R 21/045 280/752 |

* cited by examiner

*Primary Examiner* — Drew Brown
(74) *Attorney, Agent, or Firm* — Vichit Chea; MacMillan, Sobanski & Todd, LLC (57) ABSTRACT

An active bolster mounts at an interior trim surface of a passenger compartment. A plastic-molded front wall deploys to receive an impacting passenger in the passenger compartment. A plastic-molded back wall is joined around a substantially sealed perimeter with the front wall to form an inflatable bladder, wherein the back wall includes at least one substantially circumferential pleated baffle for unfolding during inflation of the bladder to deploy the front wall. An inflator delivers an inflation gas into the inflatable bladder in response to a crash event of the vehicle. An absorber member is disposed along the front wall in the bladder prior to inflation and is configured to deploy transversely to the front wall and into fixed abutment with the back wall upon inflation of the bladder to mechanically resist post-inflation movement of the front wall toward the back wall and to dissipate energy of the impacting passenger.

12 Claims, 8 Drawing Sheets

ACTIVE BOLSTER WITH SUPPLEMENTAL BRACING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to supplementing the energy absorption of an inflation gas using a mechanically-operating absorbing member that swings into place within an inflated bladder.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall (i.e., bladder wall) may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

It is known that in order to optimize the dissipation of energy when an occupant contacts an air bag or an active bolster, inflation gas should be vented to allow a controlled collapse of the airbag or bolster that safely decelerates the impacting occupant. U.S. Pat. No. 8,328,233, issued Dec. 11, 2012, which is incorporated herein by reference, discloses a variable vent for an active bolster wherein the vent has a low flow rate at low pressures and a higher flow rate at higher pressures across the vent.

A typical method for sealing the bladder walls is by hot welding, which involves heating of the matching surfaces and then compressing them together. Examples include hot plate welding, IR welding, and laser welding. A generally planar welding flange can be provided around the outer perimeter of the inner (bladder) wall which is received by a generally planar surface of the outer (trim) wall. The outer wall and/or inner surfaces may also include upstanding welding ribs that increase the weld strength by penetrating and fusing with the opposing surface during the hot welding process. Nevertheless, weld separation has continued to be a potential failure mode for active bolsters for various reasons including warping of the parts to be welded, temperature variations of the hot plates during welding, uncorrected variances in the pressure applied during welding, and characteristic differences between the trim wall and bladder wall which may be molded from different plastic formulations. For the foregoing reasons, it can be difficult to achieve a satisfactory balance of weld strength, bladder size, inflator capacity, and venting capacity.

SUMMARY OF THE INVENTION

The present invention supplements the action of the inflation gas and venting using a mechanical energy absorbing member that swings into place as a result of the outward extension of the front, trim wall of the active bolster. Once in place, the member provides additional controlled resistance against the collapse of the bladder. Multiple absorber members may be placed according to the expected loading points on the trim wall (e.g., such as the left and right knee areas for an active bolster installed in a glove box door or instrument panel).

In one aspect of the invention, an active bolster is provided for mounting at an interior trim surface of a passenger compartment in an automotive vehicle. A plastic-molded front wall deploys in a deployment direction to receive an impacting passenger in the passenger compartment. A plastic-molded back wall is joined around a substantially sealed perimeter with the front wall to form an inflatable bladder, wherein the back wall includes at least one substantially circumferential pleated baffle for unfolding during inflation of the bladder to deploy the front wall. An inflator delivers an inflation gas into the inflatable bladder in response to a crash event of the vehicle. An absorber member is disposed along the front wall in the bladder prior to inflation and is configured to deploy transversely to the front wall and into fixed abutment with the back wall upon inflation of the bladder to mechanically resist post-inflation movement of the front wall toward the back wall and to dissipate energy of the impacting passenger.

DETAILED DESCRIPTION OF PREFERRED EMBODIMENTS

Figure 1:
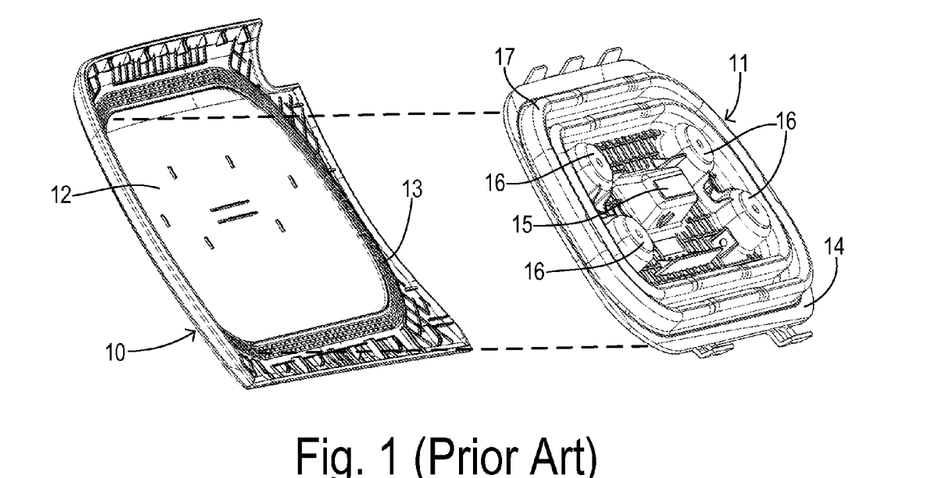
FIG. 1 is a perspective, exploded view of a prior art active bolster assembly including a trim panel front wall and a bladder back wall.
Figure 2:
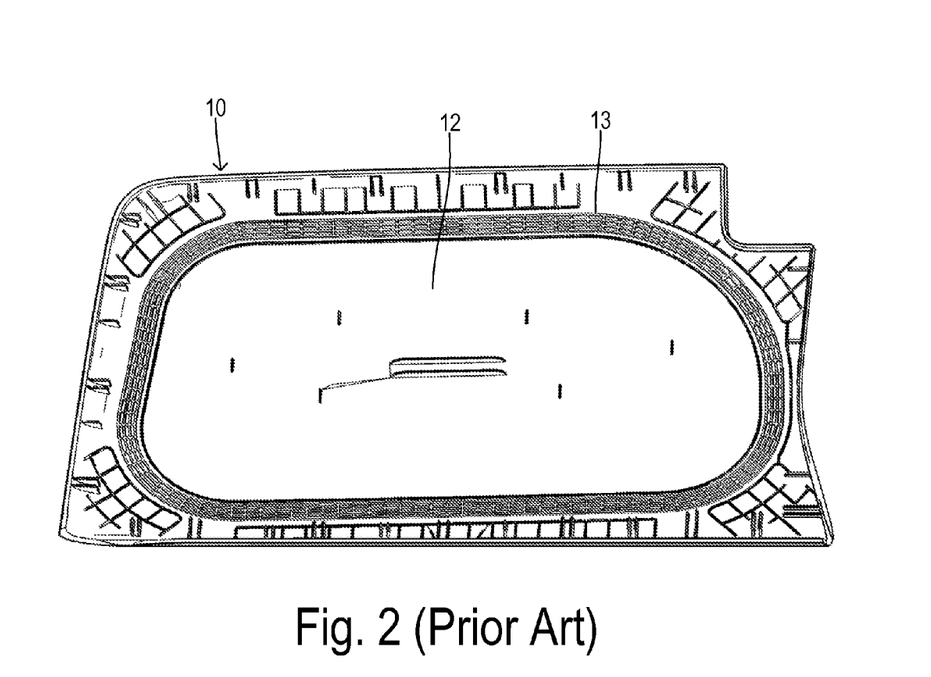
FIG. 2 is a rear plan view of an inside surface of the trim panel front wall.
Figure 3:
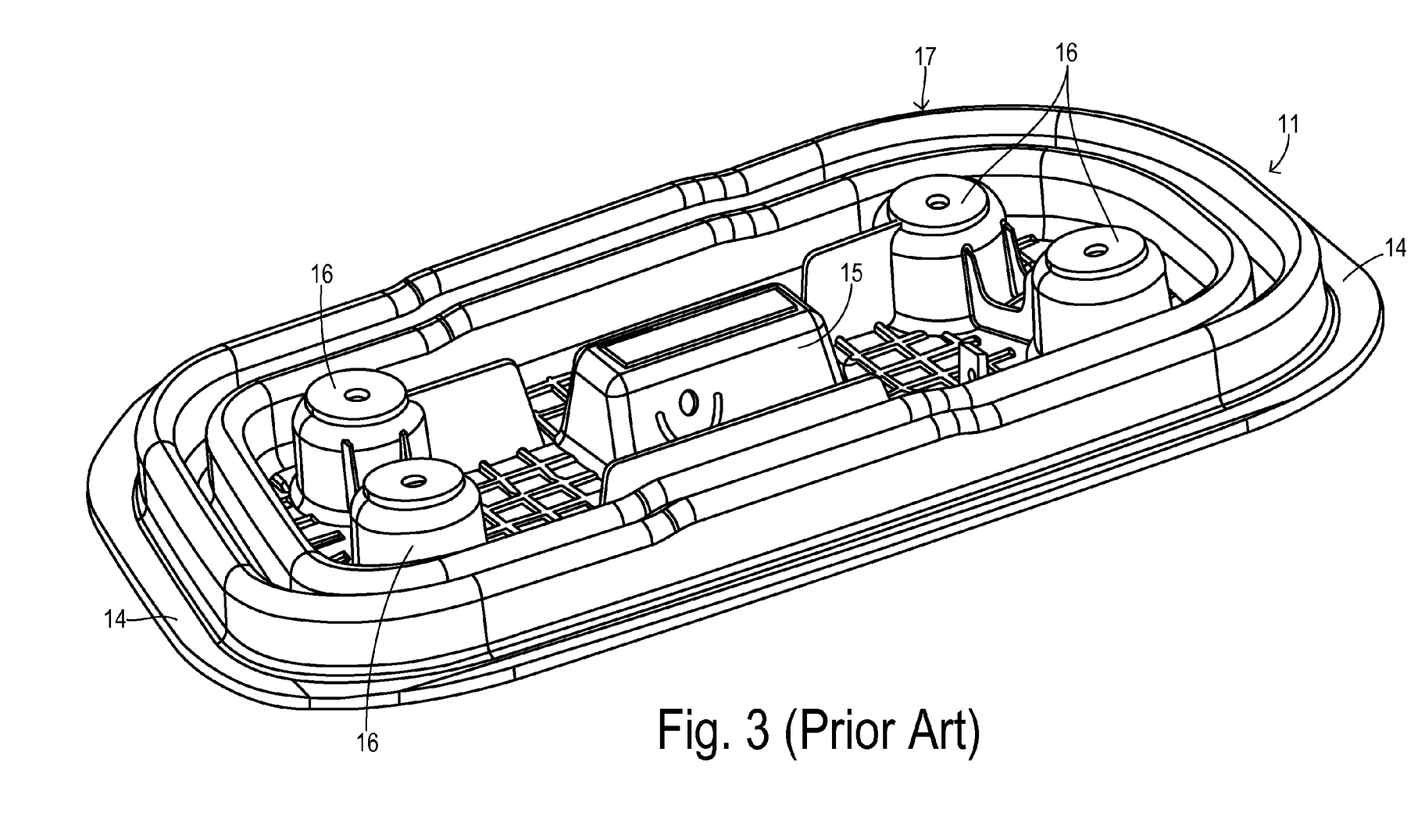
FIG. 3 is a rear perspective view of a bladder wall.

FIGS. 1-3 show components of a prior art active bolster wherein an active bolster is formed using an interior trim panel which is part of a glove box door in an automotive vehicle. More specifically, a trim panel 10 functions as a front trim wall which receives an expandable bladder wall 11. Panel 10 has an inside surface 12 with a welding track or raceway 13 preferably formed with ribs that extend upward from the inside surface in order to bond with an outer flange 14 of bladder wall 11 (e.g., by plastic welding such as hot plate welding).

Bladder wall 11 has a recess 15 near the center for mounting an inflator (not shown) and a plurality of mounting towers 16 for attaching the assembly to a reaction surface, such as an inner panel of the glove box door (not shown). A pleated region 17 is formed between towers 16 and outer flange 14 so that a series of pleats can unfold during inflation in a manner that allows trim panel 10 to displace toward the passenger cabin to cushion an impacting passenger.

Hot welding of track 13 and flange 14 creates a bladder chamber for receiving inflation gas from the inflator. During the hot welding operation, a hot plate, laser, or other heat source are used to melt plastic material of track 13 and flange 14, and after the heat source is removed then track 13 and flange 14 are pressed together and cooled so that the melted materials intermix and become welded together.

Figure 4:
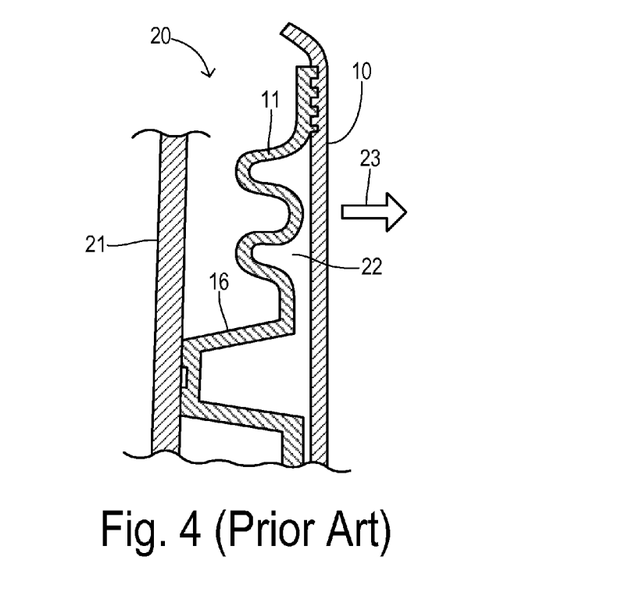
FIG. 4 is a side cross section of a portion of a prior art active bolster assembly.

FIG. 4 shows a partial cross-section of an active bolster assembly 20 including a front trim wall 10 peripherally sealed to bladder wall 11. Attachment tower 16 is welded to a reaction wall 21, which may be comprised of a glove box door inner liner, for example. During deployment as a result of an inflation gas being supplied into a bladder chamber 22, front trim wall 10 deploys in a deployment direction 23 toward a passenger in the passenger compartment of a vehicle.

Figure 5:
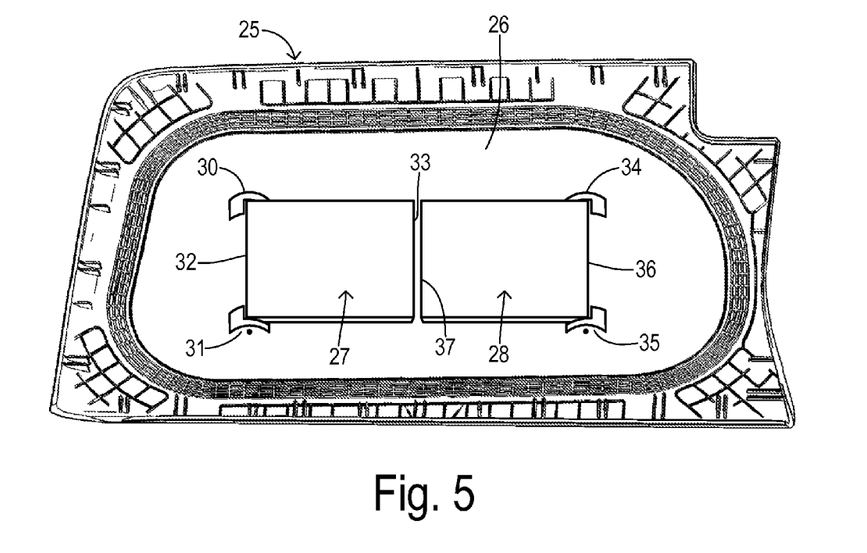
FIG. 5 is a rear perspective view of one embodiment of the invention having a pair of absorber panels on an inside surface of a trim panel.

FIG. 5 shows a first embodiment wherein a front trim wall 25 has an inner surface 26 for mounting a pair of absorber members 27 and 28 formed as generally flat panels. Absorber member 27 is pivotably mounted at mounting blocks 30 and 31 along a first end 32 so that a remote end 33 is swingable away from surface 26 during deployment of the active bolster. Absorber member 28 is pivotably mounted at mounting blocks 34 and 35 along a first end 36 so that a remote end 37 is swingable away from surface 26 during deployment. For compactness, ends 33 and 37 are shown as not overlapping but they could overlap in order to provide for a greater deployment length if necessary.

Figure 6:
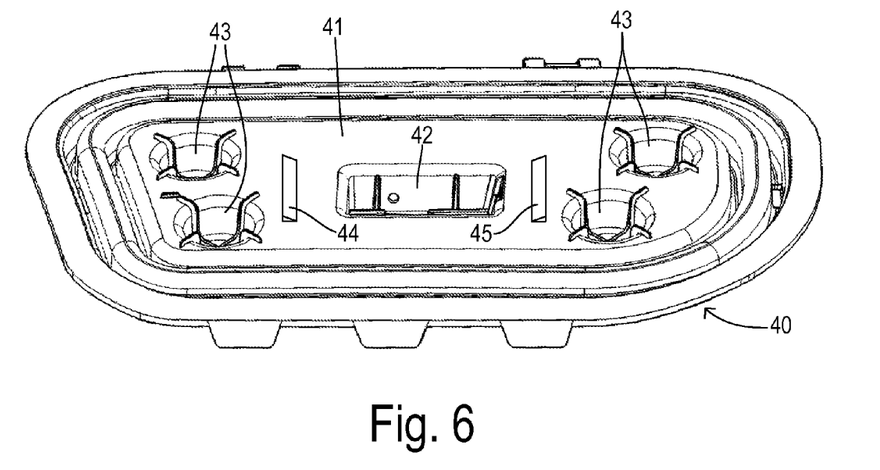
FIG. 6 is a rear perspective view of a bladder wall having step features for catching the absorber panels of FIG. 5 during deployment.

FIG. 6 shows a matching bladder wall 40 having an inner surface 41 for facing inner surface 26. Recesses into surface 41 include an inflator pocket 42 and attachment towers 43. When the bladder is inflated during a crash event resulting in front trim wall 25 moving away from the central portions of bladder wall 40, absorber members 27 and 28 swing out to extend between walls 25 and 40 (see, e.g., FIG. 10). In order for members 27 and 28 to provide resistance against the collapse of the bladder it is necessary to secure remote ends 33 and 37 against bladder wall 40. In the present embodiment, steps 44 and 45 are provided on surface 41 for securing remote ends 33 and 37, respectively.

Figure 7:
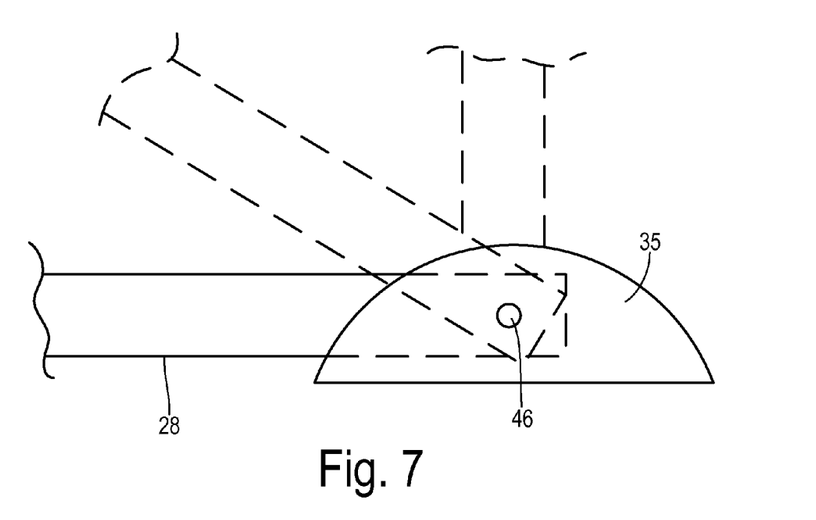
FIG. 7 is a side view showing pivoting movement of the absorber panels of FIG. 5.
Figure 8:
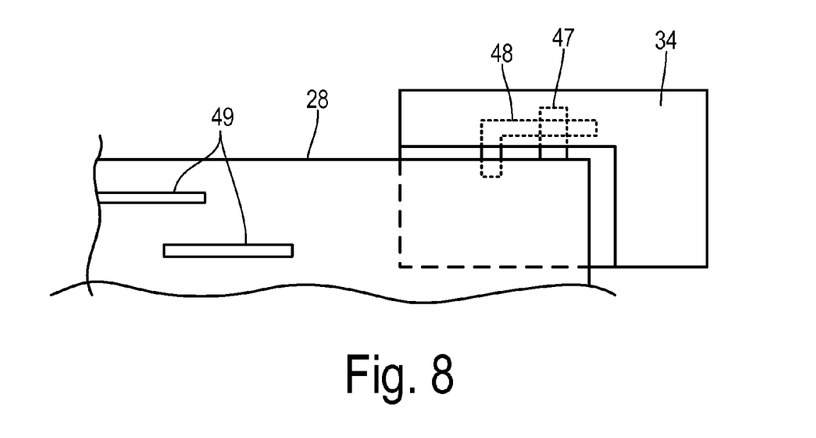
FIG. 8 is a top view showing a pivotable mounting and spring of the absorber panel.

FIG. 7 shows a side view of the pivotable movement of absorber member 28 in block 35. A hinge pin 46 connects member 28 to block 35 to facilitate pivoting to the positions shown in dashed lines. As shown in FIG. 8, a fixed bearing 47 may receive one end of a spring 48 that has its other end mounted to absorber member 28 in a manner that urges the remote end of member 28 to swing away from the front trim wall. During assembly spring 48 is loaded by pivoting member 28 so that it is disposed along the front panel wall (e.g., substantially parallel with the inner surface). Ribs 49 or other features such as slots can be formed in absorber member 28 in order to calibrate a desired dissipation of energy based on the corresponding deformation (e.g., bending and/or crumpling) to be obtained for the absorber member.

Figure 9:
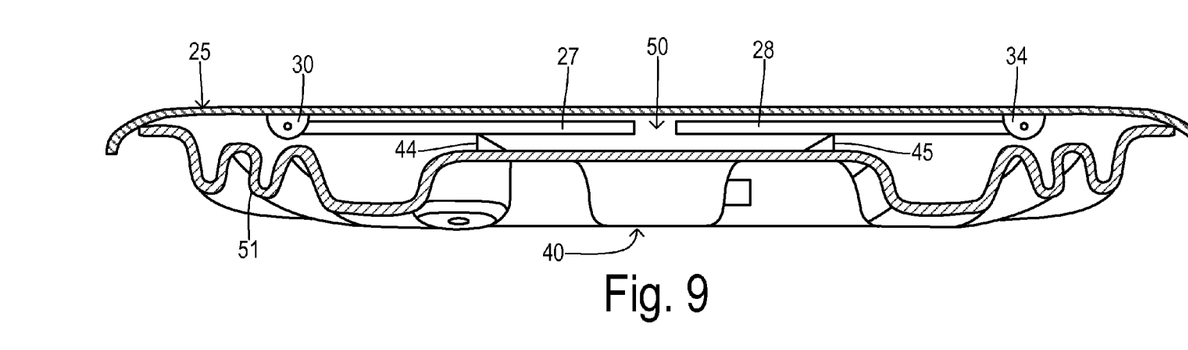
FIG. 9 is a side cross-sectional view of an active bolster assembly including the trim panel of FIG. 5 and the bladder wall of FIG. 6 prior to inflation/deployment.
Figure 10:
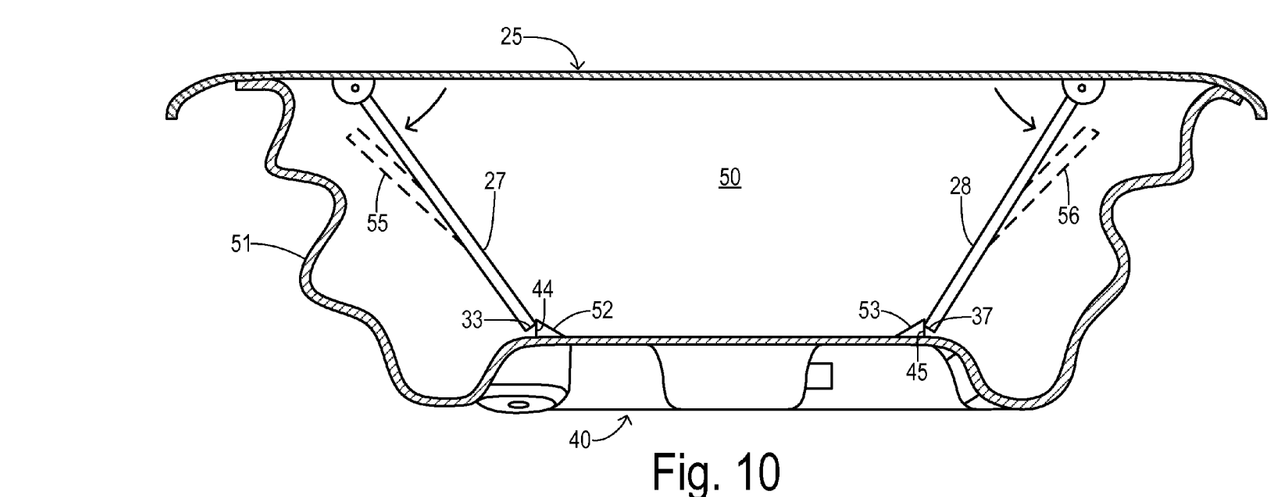
FIG. 10 is a side cross-sectional view of the active bolster assembly of FIG. 9 after inflation/deployment.

FIGS. 9 and 10 show the undeployed and deployed states of the active bolster assembly, respectively. A perimeter seal of bladder wall 40 with front trim wall 25 forms a chamber 50. Before the delivery of inflation gas, the undeployed state in FIG. 9 shows absorber members 27 and 28 disposed along front wall 25. Steps 44 and 45 project from an inner surface of bladder wall 40 to form a fixed abutment. In the deployed state of FIG. 10, movement of front wall 25 away from the central mounting portion of bladder wall 40 (due to the unfolding of pleats 51) allows absorber members 27 and 28 to swing out from front wall 25 with remote ends 33 and 37 staying in contact with bladder wall 40. Steps 44 and 45 may include integral ramps 52 and 53 allowing ends 33 and 37 to clear steps 44 and 45 during their outward motion along bladder wall 40. Thus, members 27 and 28 deploy transversely to the front wall (i.e., in a transverse direction to reach a position that is generally transverse with the trim surface and at least partially aligned with the direction of impact). Then during impact of the passenger against front trim wall 25, remote ends 33 and 37 come into abutment with and are secured by steps 44 and 45 so that absorber members 27 and 28 resist inward collapse of wall 25. Preferably, members 27 and 28 may deform as shown at 55 and 56 in order to mechanically resist post-inflation movement of the front wall toward the back wall and to dissipate energy of the impacting passenger. Preferably, the supplemental bracing achieved by the absorber members is placed according to the expected impact load and provides an energy dissipation profile that combines in a desired manner with the operation of the inflation gas and venting. In this embodiment, two absorber members are placed according to expected knee impact regions on a glove box door, for example.

Figure 11:
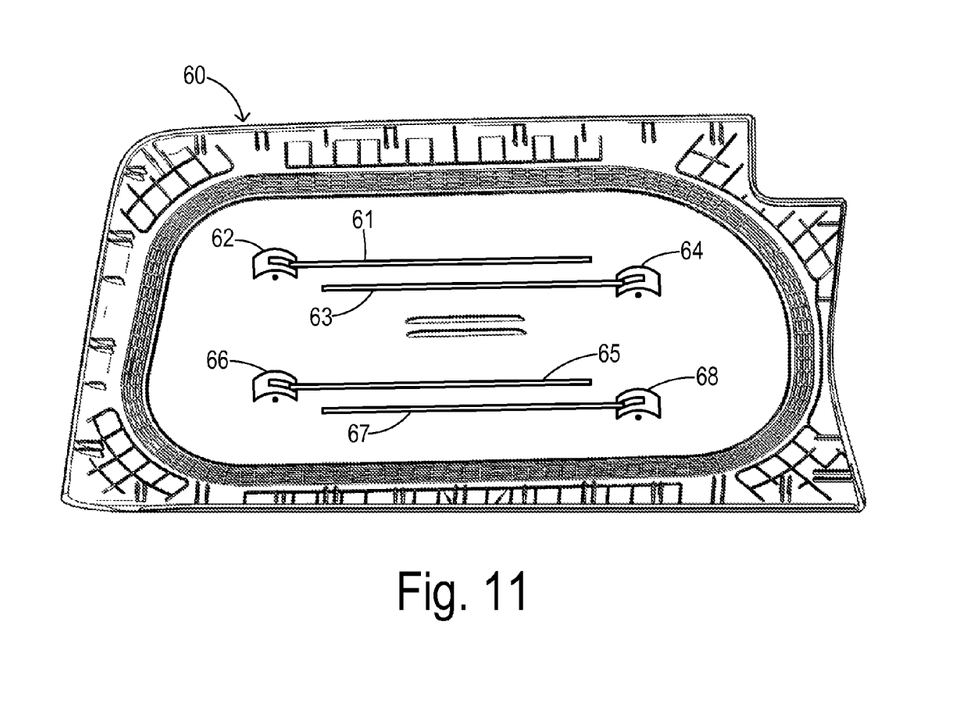
FIG. 11 is a rear perspective view of another embodiment of the invention having absorber members on an inside surface of a trim panel formed as struts.

FIG. 11 shows an alternative embodiment using longitudinal struts as absorber members instead of the flat panels of FIGS. 5-10. Thus, a front trim wall 60 includes mounting blocks 62, 64, 66, and 68 on an inner surface for mounting absorber strut members 61, 63, 64, and 67, respectively. Each strut member is pivotably mounted such that it is disposed along front wall 60 in the bladder prior to inflation and is configured to deploy transversely from front wall 60 and into fixed abutment with a back wall upon inflation of the bladder to mechanically resist post-inflation movement of front wall 60 toward the back wall and to dissipate energy of the impacting passenger.

Figure 12:
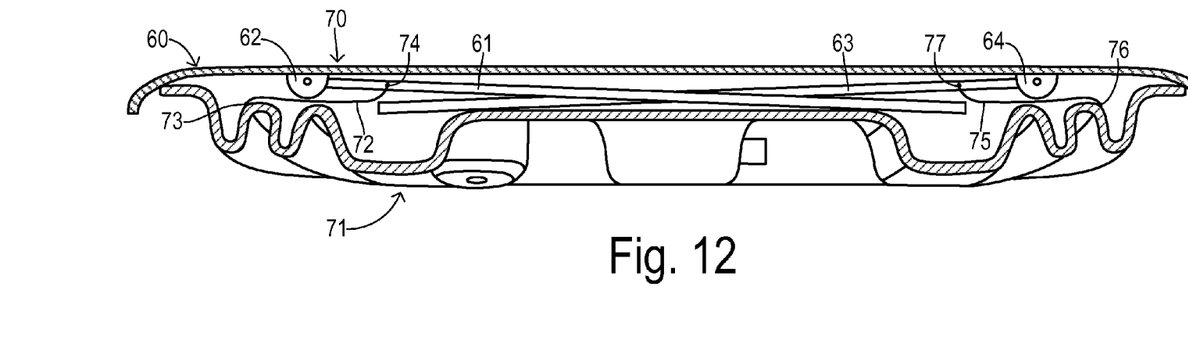
FIG. 12 is a side cross-sectional view of an active bolster assembly including the trim panel of FIG. 11 prior to inflation/deployment.
Figure 13:
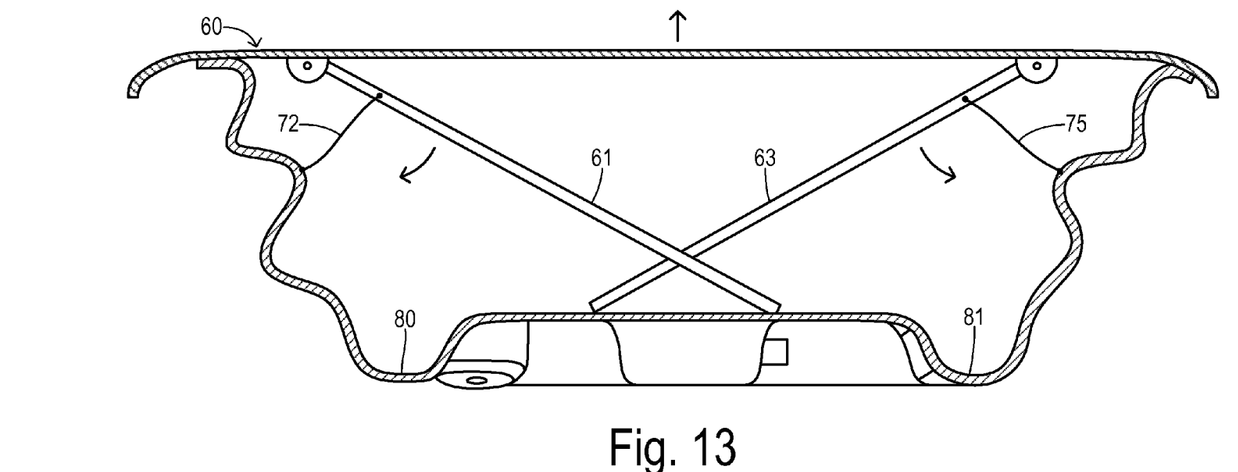
FIG. 13 is a side cross-sectional view of the active bolster assembly of FIG. 12 with the inflation/deployment in progress.

FIG. 12 shows the undeployed state of an active bolster assembly 70 in which trim wall 60 has been welded to a bladder wall 71. Absorber members 61 and 63 are disposed in a bladder chamber along front wall 60. Instead of springs used in the mounting blocks, this embodiment shows tethers for pivoting the absorber members during deployment. A tether 72 is attached to bladder wall 71 at a point 73 (e.g., near the pleated section) and to absorber member 61 at a point 74. Similarly, a tether 75 is attached to bladder wall 71 at a point 76 and to absorber member 63 at a point 77. FIG. 13 shows a partially deployed state wherein tethers 72 and 75 are shown keeping strut members 61 and 63 against bladder wall 71.

Figure 14:
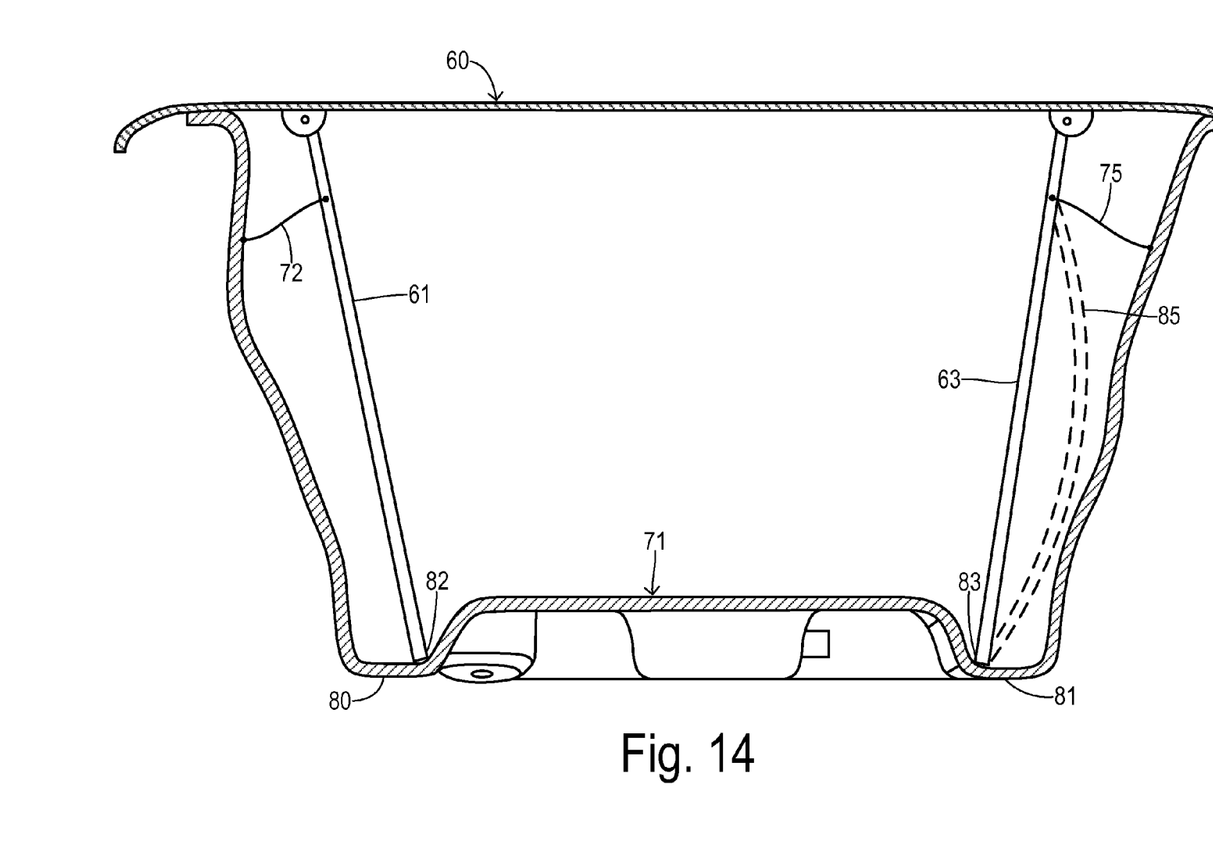
FIG. 14 is a side cross-sectional view of the active bolster assembly of FIG. 12 after inflation/deployment.

Strut members 61 and 63 are by design aligned with attachment towers 80 and 81. In FIG. 13, the remote ends of strut members 61 and 63 are approaching the corresponding depressions formed by attachment towers 80 and 81. FIG. 14 shows a fully deployed state wherein outward movement of front wall 60 has caused tethers 72 and 75 to pivot absorber strut members 61 and 63 so that their remote ends 82 and 83 have entered into abutment in the bottom ends of attachment towers 80 and 81, respectively. Thus, members 61 and 63 are captured in place so that impact forces against front trim wall 60 may cause deformation of members 61 and 63 as shown at 85, for example. By using attachment towers 80 and 81, no additional structures are needed on bladder wall 71 for implementing supplemental bracing for adding mechanical resistance to impact forces to the resistance obtained by venting the inflation gas.

What is claimed is:

1. An active bolster for mounting at an interior trim surface of a passenger compartment in an automotive vehicle, comprising:
    a plastic-molded front wall for deploying to receive an impacting passenger in the passenger compartment;
    a plastic-molded back wall joined around a substantially sealed perimeter with the front wall to form an inflatable bladder, wherein the back wall includes at least one substantially circumferential pleated baffle for unfolding during inflation of the bladder to deploy the front wall;
    an inflator for delivering an inflation gas into the inflatable bladder in response to a crash event of the vehicle; and
    an absorber member disposed along the front wall in the bladder prior to inflation and configured to deploy transversely to the front wall and into fixed abutment with the back wall upon inflation of the bladder to mechanically resist post-inflation movement of the front wall toward the back wall and to dissipate energy of the impacting passenger.

2. The active bolster of claim 1 wherein the absorber member is comprised of a plastic panel hinged from the front wall.

3. The active bolster of claim 2 further comprising a second absorber member formed as a second plastic panel.

4. The active bolster of claim 1 wherein the absorber member is pivotably mounted to the front wall.

5. The active bolster of claim 4 wherein the back wall includes a step for interfacing with the absorber member after deployment to maintain a pivoted orientation of the absorber member.

6. The active bolster of claim 4 further comprising a spring bearing on the absorber member for pivoting the absorber member during the deployment.

7. The active bolster of claim 4 further comprising a tether coupled between the absorber member and the back wall for pivoting the absorber member during the deployment.

8. The active bolster of claim 1 wherein the absorber member is deformable in response to the impacting passenger.

9. The active bolster of claim 1 wherein the back wall includes a plurality of attachment towers projecting from a central region within the baffle for mounting the active bolster to a reaction surface, and wherein the absorber member is captured in one of the attachment towers to provide the fixed abutment.

10. A bladder for an active bolster comprising:
    a trim wall;
    a bladder wall sealed to the trim wall having a circumferential pleat unfolding during inflation to extend the trim wall; and
    an absorber member pivoting from the trim wall to deploy transversely between the trim and bladder walls during inflation to then resist movement of the trim wall toward the bladder wall and to dissipate energy of an impacting body against the trim wall.

11. The bladder of claim 10 wherein the absorber member is comprised of a plastic panel hinged from the trim wall.

12. The bladder of claim 11 further comprising a second absorber member formed as a second plastic panel independently hinged from the trim wall.

\* \* \* \* \*